(12) United States Patent
Fentzlaff et al.

(10) Patent No.: US 12,385,768 B2
(45) Date of Patent: Aug. 12, 2025

(54) AIR DUCT AIRFLOW SENSOR

(71) Applicant: Johnson Controls Tyco IP Holdings LLP, Milwaukee, WI (US)

(72) Inventors: Brennan Fentzlaff, Oconomowoc, WI (US); Mark G. Freund, Wauwatosa, WI (US); Jon Douglas, Mequon, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 256 days.

(21) Appl. No.: 17/900,297

(22) Filed: Aug. 31, 2022

(65) Prior Publication Data
US 2024/0068850 A1    Feb. 29, 2024

(51) Int. Cl.
*G01F 1/36* (2006.01)

(52) U.S. Cl.
CPC .................................. *G01F 1/363* (2013.01)

(58) Field of Classification Search
CPC ... G01F 1/363; G01F 1/46; G01F 1/40; G01F 5/00; G01F 1/684; F24F 11/30;
(Continued)

(56) References Cited

U.S. PATENT DOCUMENTS

| | | |
|---|---|---|
| 3,525,259 A | 8/1970 | Stough |
| 4,061,266 A | 12/1977 | Ley, Jr. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

6" Universal Automatic Make-Up Air Damper with Pressure Sensor Kit, posted on [Sep. 5, 2012] [online], [retrieved Apr. 19, 2023]. Retrieved from internet, https://www.amazon.com/Universal-Automatic-Make-Up-Damper-Pressure/dp/B0OR8MQHW8/ (Year: 2012).

(Continued)

*Primary Examiner* — Stephen D Meier
*Assistant Examiner* — Leo T Hinze
(74) *Attorney, Agent, or Firm* — Foley & Lardner LLP

(57) ABSTRACT

An airflow sensor system for an air duct including a damper positioned therein is provided. The controller is configured to determine, via a first pressure sensor, a first airflow measurement based on a first one or more pressure measurements. The controller is further configured to determine, via a second pressure sensor and a damper position sensor, a second airflow measurement based on a second one or more pressure measurements and one or more damper position measurements. The first airflow measurement and the second airflow measurement have a first uncertainty value and a second uncertainty value associated therewith. The controller is further configured to determine an estimated airflow based on weighted values of the first airflow measurement and the second airflow measurement. The weighted values are based on the airflow measurements and the uncertainty values associate therewith.

19 Claims, 10 Drawing Sheets

(58) Field of Classification Search
CPC .. F24F 11/49; F24F 11/74; F24F 13/10; F24F 2110/40; G05D 7/00
See application file for complete search history.

(56) References Cited

U.S. PATENT DOCUMENTS

| | | | |
|---|---|---|---|
| D264,375 S | 5/1982 | Prikkel |
| D264,376 S | 5/1982 | Prikkel |
| D298,473 S | 11/1988 | Stackhouse et al. |
| 5,289,819 A | 3/1994 | Kroger et al. |
| 5,458,148 A | 10/1995 | Zelczer et al. |
| 5,461,932 A | 10/1995 | Hall et al. |
| 5,586,861 A | 12/1996 | Berger |
| D377,829 S | 2/1997 | Andresen |
| 5,720,658 A | 2/1998 | Belusa |
| 5,979,247 A | 11/1999 | Kizawa |
| 6,099,405 A | 8/2000 | Cunningham, Jr. |
| D430,482 S | 9/2000 | Stout |
| 6,164,142 A | 12/2000 | Dimeff |
| D436,399 S | 1/2001 | Poland |
| 6,192,922 B1 | 2/2001 | MacGibbon et al. |
| 6,253,624 B1 | 7/2001 | Broden et al. |
| 6,311,568 B1 | 11/2001 | Kleven |
| 6,324,917 B1 | 12/2001 | Mack et al. |
| 6,450,043 B1 | 9/2002 | Kolkebeck et al. |
| D475,448 S | 6/2003 | Stout, Jr. |
| D475,780 S | 6/2003 | Stout, Jr. |
| D488,858 S | 4/2004 | Stout |
| D489,806 S | 5/2004 | Stout |
| 6,912,919 B2 | 7/2005 | Shiba et al. |
| 7,275,533 B2 | 10/2007 | Soeholm et al. |
| 7,392,826 B2 | 7/2008 | Schub et al. |
| 8,430,731 B2 | 4/2013 | Bamberger |
| D729,926 S | 5/2015 | Tomasiak |
| 9,068,867 B2 | 6/2015 | Ayers et al. |
| 9,255,721 B2 | 2/2016 | Donohue |
| D757,919 S | 5/2016 | Ltd |
| 9,447,985 B2 | 9/2016 | Johnson |
| 9,459,126 B2 | 10/2016 | Verhaagen et al. |
| D771,234 S | 11/2016 | Smith et al. |
| D771,792 S | 11/2016 | Smith et al. |
| 9,506,668 B2 | 11/2016 | Sinur et al. |
| 9,512,925 B2 | 12/2016 | Shanker et al. |
| 9,581,347 B2 | 2/2017 | Fiorita |
| 9,605,856 B2 | 3/2017 | Coogan |
| 9,964,421 B1 | 5/2018 | Buckley et al. |
| 10,060,617 B2 | 8/2018 | Horng et al. |
| 10,174,847 B2 | 1/2019 | Kabierschke et al. |
| 10,260,537 B2 | 4/2019 | Sawchuk |
| 10,365,143 B2 | 7/2019 | Sawchuk et al. |
| 10,451,461 B2 | 10/2019 | Nesbitt et al. |
| 10,768,031 B2 | 9/2020 | Scholten |
| 10,871,756 B2 | 12/2020 | Johnson et al. |
| 10,908,578 B2 | 2/2021 | Johnson et al. |
| 10,921,768 B2 | 2/2021 | Johnson et al. |
| D930,142 S | 9/2021 | Lu et al. |
| 11,156,978 B2 | 10/2021 | Johnson et al. |
| 11,499,855 B2 | 11/2022 | Mekias |
| 11,578,885 B2 | 2/2023 | Wennerstrå-m |
| D981,550 S | 3/2023 | Bredahl |
| 11,713,986 B2 | 8/2023 | Ming |
| D1,004,071 S | 11/2023 | Pillarella et al. |
| 11,846,434 B2 | 12/2023 | Karamanos et al. |
| D1,014,731 S | 2/2024 | Scholten |
| 12,000,721 B2 | 6/2024 | Scholten |
| 2004/0238046 A1 | 12/2004 | Hoffman et al. |
| 2006/0234621 A1 | 10/2006 | Desrochers et al. |
| 2008/0307896 A1 | 12/2008 | Ifft et al. |
| 2009/0126382 A1 | 5/2009 | Rubino et al. |
| 2011/0314839 A1 | 12/2011 | Brook et al. |
| 2013/0245836 A1 | 9/2013 | Goodfellow |
| 2014/0124057 A1 | 5/2014 | Freund et al. |
| 2014/0260692 A1 | 9/2014 | Sharp |
| 2015/0153056 A1 | 6/2015 | Gretillat et al. |
| 2015/0253781 A1 | 9/2015 | Ashton et al. |
| 2015/0354845 A1 | 12/2015 | Brown et al. |
| 2016/0018120 A1 | 1/2016 | Omura et al. |
| 2016/0103003 A1 | 4/2016 | Hering |
| 2016/0252265 A1 | 9/2016 | Omura et al. |
| 2016/0263967 A1 | 9/2016 | Schaake |
| 2017/0115022 A1 | 4/2017 | Grosshart et al. |
| 2017/0248237 A1 | 8/2017 | Kabierschke et al. |
| 2017/0254557 A1 | 9/2017 | Chiu |
| 2017/0356666 A1 | 12/2017 | Adkerson |
| 2019/0137126 A1 | 5/2019 | Desrochers |
| 2019/0219300 A1 | 7/2019 | Scholten et al. |
| 2019/0219430 A1* | 7/2019 | Scholten .................. G05D 7/00 |
| 2019/0353385 A1* | 11/2019 | Aucoin .................... F24F 11/63 |
| 2021/0018215 A1 | 1/2021 | Scholten et al. |
| 2021/0172778 A1 | 6/2021 | Scholten et al. |
| 2021/0172779 A1 | 6/2021 | Scholten |
| 2022/0155111 A1 | 5/2022 | Redmond et al. |
| 2022/0203287 A1 | 6/2022 | Wenger et al. |
| 2022/0203288 A1 | 6/2022 | Wenger et al. |
| 2022/0205962 A1 | 6/2022 | Vanderkoy |
| 2022/0207215 A1 | 6/2022 | Liu et al. |
| 2022/0221184 A1 | 7/2022 | Gupta et al. |
| 2022/0228756 A1 | 7/2022 | Gupta et al. |
| 2022/0254483 A1 | 8/2022 | Boisvert et al. |
| 2022/0277851 A1 | 9/2022 | Wellig |
| 2022/0282886 A1 | 9/2022 | Hriljac et al. |
| 2022/0293261 A1 | 9/2022 | Mcbrady et al. |
| 2022/0305438 A1 | 9/2022 | Wenger et al. |
| 2022/0305881 A1 | 9/2022 | Neu et al. |
| 2022/0316927 A1 | 10/2022 | Hohlfeld et al. |

FOREIGN PATENT DOCUMENTS

| | | |
|---|---|---|
| CN | 201100426 Y | 8/2008 |
| CN | 201184422 Y | 1/2009 |
| CN | 101566237 A | 10/2009 |
| CN | 201688962 U | 12/2010 |
| CN | 103968145 A | 8/2014 |
| DE | 19717335 | 11/1997 |
| EP | 1 783 409 A1 | 5/2007 |
| EP | 2 508 815 A1 | 10/2012 |
| EP | 3 186 687 A4 | 7/2017 |
| EP | 3 497 377 A1 | 6/2019 |
| FR | 2748308 A1 | 11/1997 |
| GB | 0 955 502 A | 4/1964 |
| JP | H01-311911 A1 | 12/1989 |
| JP | 5604093 B2 | 10/2014 |
| JP | 2018-076008 A | 5/2018 |
| KR | 3020180030831 | 12/2018 |
| KR | 3020200051247 | 9/2021 |
| KR | 3020200063882 | 11/2021 |
| KR | 3020210059387 | 12/2022 |
| WO | WO-2017/183365 A1 | 10/2017 |

OTHER PUBLICATIONS

Alvarado et al., "A Methodology to Monitor Airborne PM10 Dust Particles Using a Small Unmanned Aerial Vehicle," Sensors, 2017, vol. 17 (25 pages).

RS-2000 True Round Smoke Damper, posted on [retrieved Apr. 18, 2023]. Retrieved from internet, https://www.johnsoncontrols.com/hvac-equipment/air-distribution/dampers-and-louvers/dampers/rs-2000 (Year: 2023).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-

(56) References Cited

OTHER PUBLICATIONS

Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "Jla Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
CN Office Action on CN 201980018253.2, dated Jul. 27, 2021, with translation (24 pages).
CN Office Action with Search Report on CN Appl. Ser. No. 201980018253.2 dated Apr. 8, 2022, with translation (48 pages).
International Search Report and Written Opinion on PCT/US2019/014085, dated Jun. 21, 2019, 20 pages.
Suncourt 10 in. Motorized Adjustable Damper Closed; Review date: May 31, 2019; https://www.homedepot.com/p/Suncourt-10-in-Motorized-Adjustable-Damper-Closed-ZC210/306715038 (pp. 1-3).

* cited by examiner

AIR DUCT AIRFLOW SENSOR

BACKGROUND

The present disclosure generally relates to air duct airflow sensors. Air dampers are mechanical valves used to permit, block, and control the flow of air in air ducts. Generally, a pressure sensor is incorporated to detect and measure the air pressure in the air duct. Pressure measurements can be used to determine the amount of airflow through the duct and to actuate a damper mechanism to open or close, thus affecting airflow. Various pressure measurement devices may have varying levels of uncertainty associated with the pressure measurements.

SUMMARY

One implementation of the present disclosure is an airflow sensor system for an air duct. The air duct includes a duct wall and an axial bore that extends from an inlet of the air duct to an outlet of the air duct for conveying an airflow through the air duct from the inlet to the outlet. The airflow sensor assembly includes a first pressure sensor, a second pressure sensor, a damper position sensor, and a controller. The damper position sensor is configured to detect one or more damper position measurements associated with a damper located within the axial bore. The controller is configured to determine, via the first pressure sensor, a first airflow measurement based on a first one or more pressure measurements. The first airflow measurement has associated first uncertainty value. The controller is further configured to determine, via the second pressure sensor and the damper position sensor, a second airflow measurement based on a second one or more pressure measurements and one or more damper position measurements. The second airflow measurement has an associated second uncertainty value. The controller is further configured to determine a first weighted value of the first airflow measurement based on the first uncertainty value. The controller is further configured to determine a second weighted value of the second airflow measurement based on the second uncertainty value. The controller is further configured to determine an estimated airflow based on the first weighted value and the second weighted value. In some embodiments, the first weighted value increases relative to the second weighted value in response to an increase of the second uncertainty value relative to the first uncertainty value.

Another implementation of the present disclosure is a method of operating an air duct. The method includes measuring a first differential pressure measurement regarding an airflow within the air duct with a first pressure sensor. In some embodiments, the first differential pressure measurement has an associated first uncertainty value. The method further includes measuring a second differential pressure measurement regarding the airflow with a second pressure sensor. In some embodiments, the second differential pressure measurement has an associated second uncertainty value different than the first uncertainty value. The method further includes sending, via the first pressure sensor, the first differential pressure measurement to a controller. The method further includes sending, via the second pressure sensor, the second differential pressure measurement to the controller. The method further includes determining, via the controller, a first airflow measurement based on the first differential pressure measurement. In some embodiments, the first airflow measurement has a third uncertainty value based on the first uncertainty value. The method further includes determining, via the controller, a second airflow measurement based on the second differential pressure measurement. In some embodiments, the second airflow measurement has a fourth uncertainty value based on the second uncertainty value. The method further includes determining, via the controller, an estimated airflow based on the first airflow measurement, the second airflow measurement, the third uncertainty value, and the fourth uncertainty value. In some embodiments, the estimated airflow has an associated fifth uncertainty value that is less than the third uncertainty value and the fourth uncertainty value.

Yet another implementation of the present disclosure is a controller for operating an air duct. The controller includes one or more processors and a memory. The one or more processors are configured to measure, via a number of pressure sensors, a number of differential pressure measurements regarding an airflow within the air duct. The one or more processors are further configured to determine a number of uncertainty values regarding the number of differential pressure measurements. In some embodiments, a first uncertainty value of the number of uncertainty values is different than a second uncertainty value of the number of uncertainty values. The one or more processors are further configured to determine an estimated airflow based on the number of differential pressure measurements and the number of differential pressure measurements. In some embodiments, the estimated airflow has an associated third uncertainty value that is less than the first uncertainty value and the second uncertainty value.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The drawings disclose exemplary embodiments in which like reference characters designate the same or similar parts throughout the figures of which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to air duct assemblies, including, but not limited to, determining a measure of airflow within an air duct. In some embodiments, one or more sensors may be used to determine one or more airflow measurements within the air duct. Such airflow measurements may have an uncertainty value associated therewith. In some embodiments, systems and methods provide reduce the uncertainty associated with pressure measurements of an airflow sensor, thereby improving the control of damper mechanisms.

Uncertainty values represent a deviation between a measured value and an actual value. Depending on the implementation of an air duct assembly (or some other system leveraging a determination of airflow measurements), various sensors may be used to determine (e.g., measure) conditions associated with the air duct (e.g., air pressure, air velocity, air temperature, humidity, etc.). Such conditions may be used to determine airflow measurements. However, these conditions may be determined via systems and/or methods that result in an uncertainty value associated with the measurement of such conditions. Accordingly, in some systems, airflow measurements may be associated with uncertainty values.

In some embodiments, an air duct assembly may include two or more pressure sensors. The two or more pressure sensors may have different uncertainty values associated with airflow measurements that the two or more pressure sensors are used to determine. Advantageously, the airflow measurements determined by the two or more pressure sensors may be fused (e.g., algebraically juxtaposed, cross-referenced, etc.) in a weighted-average method that provides a resulting estimation of airflow that has a determinable uncertainty value associated therewith. The weighted-average method of determining the estimation of airflow may be based on the airflow measurements and their associated uncertainty values. In some embodiments, the determinable uncertainty value associated with the estimated airflow may be less than the uncertainties associated with the airflow measurements provided by the one or more pressure sensors. The systems and methods provided herein may allow for improved accuracy in airflow measurement systems in some embodiments. In some embodiments, the air duct assembly provided for herein may be used to control a damper (e.g., a valve, an airflow resistor, a vent, etc.) to adjust airflow within the air duct in response to a desired setpoint airflow condition within the air duct.

Figure 1A:
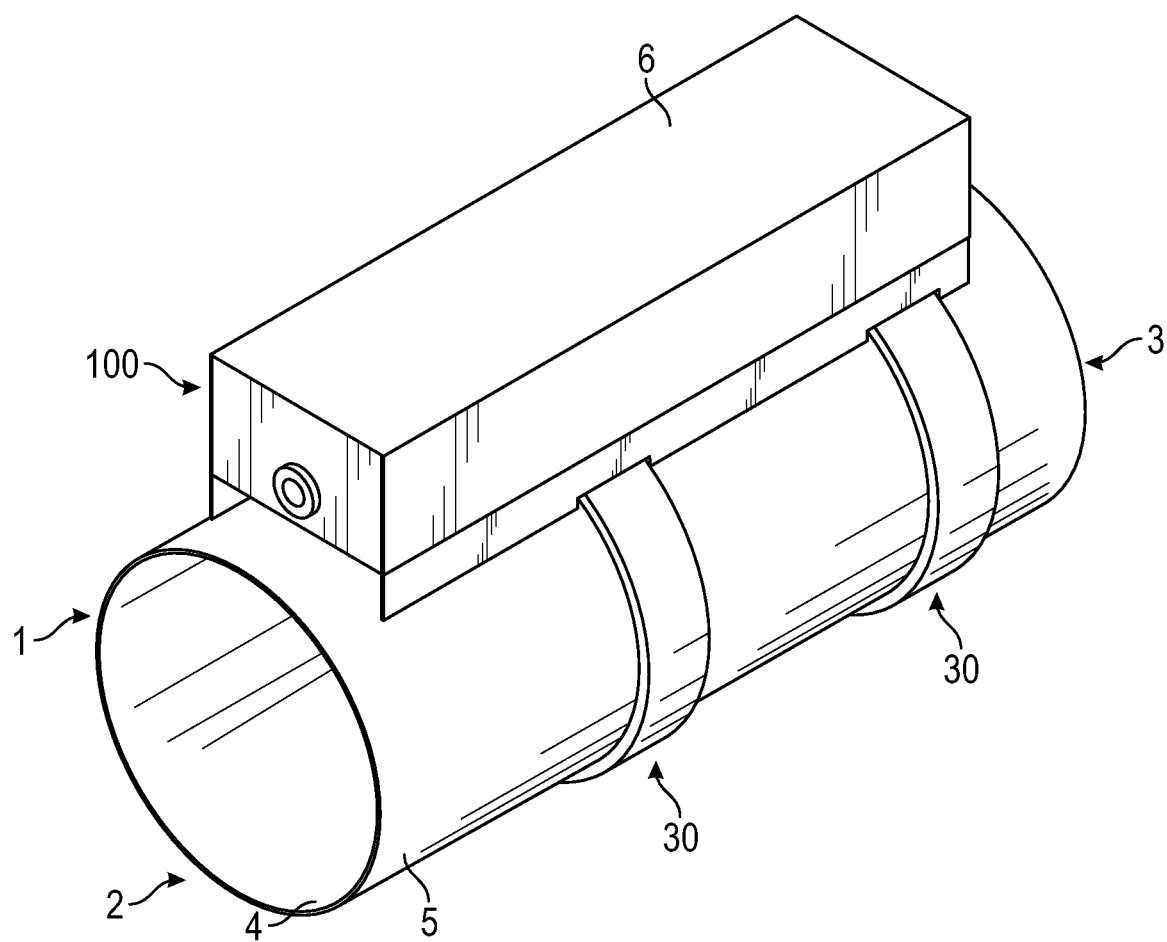
FIG. 1A is an isometric view of an air duct assembly, according to some embodiments.

Turning now to FIG. 1A, a perspective view of an air duct assembly 1 is shown, according to some embodiments. As shown, the air duct assembly 1 includes a first end 2, a second end 3, an interior wall 4, an exterior wall 5, and a control assembly 100. The first end 2, second end 3, interior wall 4, and exterior wall 5 may form an air duct body containing an axial bore through which air may flow. The control assembly 100 may be provided within a housing 6. In some embodiments, the first end 2 and/or the second end 3 may be in fluid communication with one or more spaces (e.g., rooms, environments, chambers, outdoor areas, etc.) in order to transfer an amount of airflow (e.g., transfer air at a volumetric flow rate) from one space to another. A fan (or other actuating device) may act to create a pressure gradient (e.g., negative) within the air duct assembly 1. For example, a fan may be located on the second end 3 to create a negative pressure gradient running from the first end 2 to the second end 3, thus drawing air across the air duct assembly 1 from the first end 2 to the second end 3. In some embodiments, the first end 2 is operable as an inlet for the airflow of the air duct assembly, while the second end 3 is operable as an outlet for the airflow of the air duct assembly. Alternatively, the fan is located on the first end 2 to create a negative pressure gradient running from the second end 3 to the first end 2, thus drawing air across the air duct assembly 1 form the second end 3 to the first end 2. Thus, although generally described herein as a system that draws air from the first end 2 to the second end 3 of the air duct assembly, it should be appreciated that the air duct assembly 1 is operated to draw air in either direction at varying velocities, depending on the implementation. While depicted as forming a circular cross-section, the air duct assembly 1, (particularly with reference to the interior wall 4 and the exterior wall 5) is formed in any geometrical configuration suitable for the systems and methods described herein (e.g., a square, rectangle, ellipse, etc.).

Figure 1B:
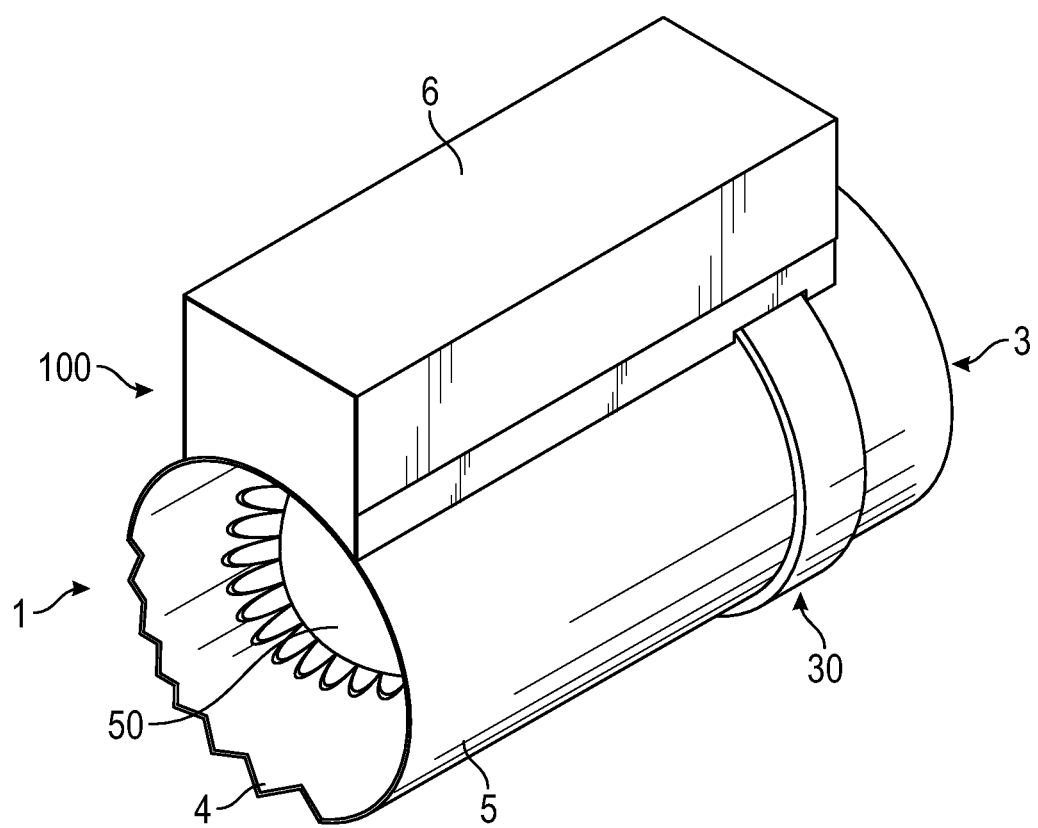
FIG. 1B is a partial isometric view of the air duct assembly of FIG. 1A, according to some embodiments.

Referring now to FIG. 1B, another perspective view of the air duct assembly 1 depicted in FIG. 1A is shown, according to some embodiments. As depicted in FIG. 1B, a portion of the air duct assembly 1 towards the first end 2 is cut away to provide a perspective view of the interior of the air duct assembly 1 (e.g., within the interior wall 4). As shown, the air duct assembly 1 may include an air damper assembly 50. In some embodiments, the air damper assembly 50 is positioned within the interior wall 4 to control a volume of air flowing through the air duct assembly 1 from the first end 2 to the second end 3, or vice-versa (depending on the implementation). In some embodiments, the air damper assembly 50 is operated such that the air duct assembly 1 facilitates a variable air volume (VAV) system. For example, the first end 2 of the air duct assembly 1 may draw air from a space. A remote device (such as a remote device 7 as depicted with reference to FIG. 9) may communicate, to the control assembly 100, a setpoint (e.g., desired, selected, scheduled, etc.) airflow to be drawn from the space (e.g., based on changing conditions of the space or adjustments to the conditions of the space). While the fan (described above with reference to FIG. 1A) operates at a constant speed, an airflow being drawn through the air duct assembly 1 is adjusted by the air damper assembly 50 in order to affect a change in airflow being drawn from the space in some embodiments. In some embodiments, the air damper assembly 50 is operated by the control assembly 100 to decrease a difference between the setpoint airflow and a measured airflow. In some embodiments, the measured airflow is determined by the control assembly 100, as described in greater detail herein. Thus, as described in greater detail herein, the control assembly 100 is configured to receive a setpoint airflow from the remote device 7, determine a measured airflow within the air duct assembly 1, and control the air damper assembly 50 accordingly. The air damper assembly 50 is "opened" (e.g., rotated such that the air damper assembly 50 is closer to, or is in, a parallel position with respect to the direction of airflow traveling through the air duct assembly 1). In some embodiments, when the air damper assembly is fully opened, air is able to freely travel through the air duct assembly 1, e.g., as dictated by the speed of the fan, depending on the structure of the air damper assembly 50. The air damper assembly 50 is "closed" (e.g., rotated such that the air damper assembly 50 is closer to, or is in, a perpendicular position with respect to the airflow traveling through the air duct assembly 1). In some embodiments, when the air damper assembly is fully closed, air is completely (or substantially) blocked from traveling through the air duct assembly 1, despite the operation of the fan. While depicted as generally forming a circular damper, the air damper assembly 50 is formed in any geometrical configuration suitable for the systems and methods described herein (e.g., a square, rectangle, ellipse, etc.).

Figure 2:
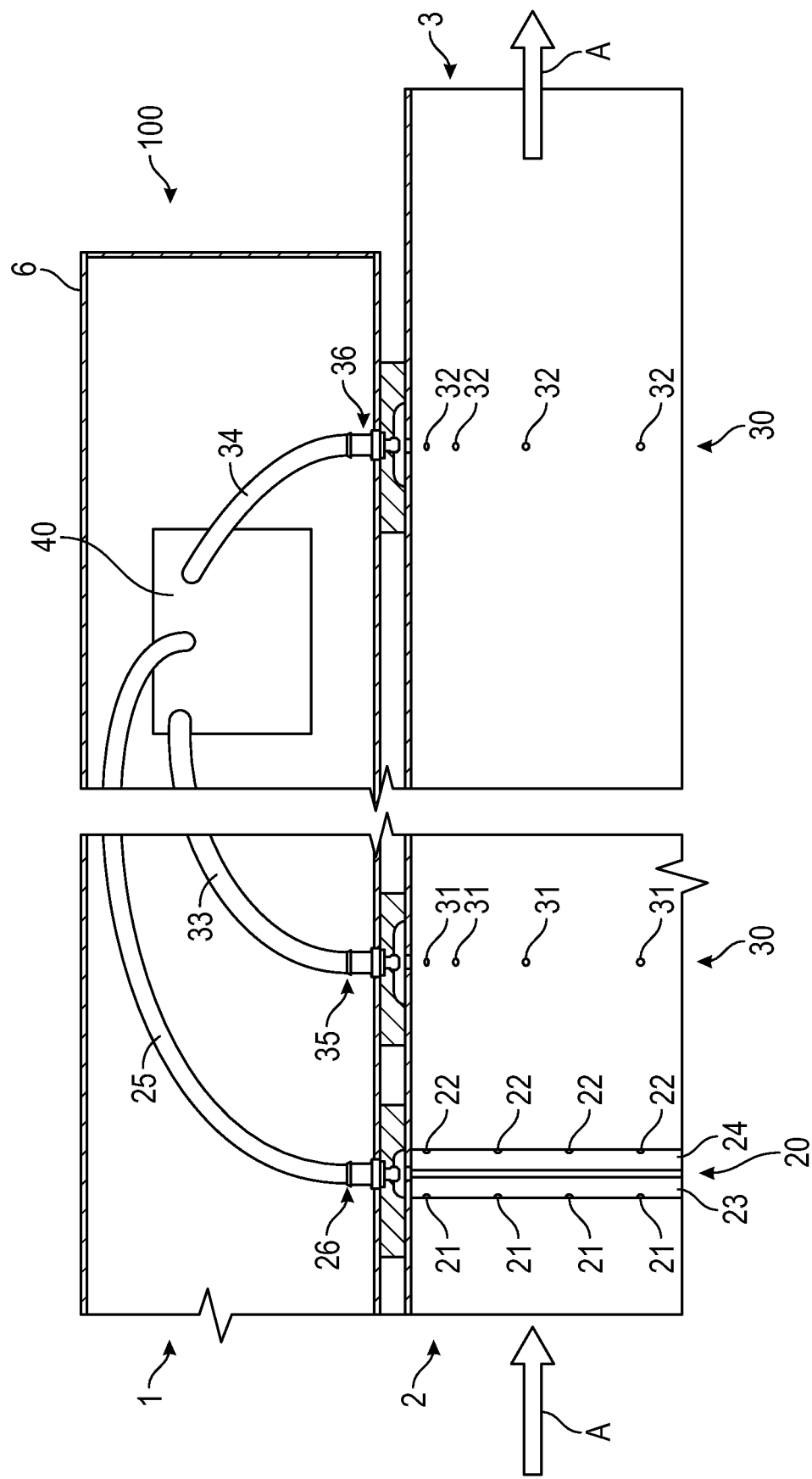
FIG. 2 is a side cross-sectional view of an air duct airflow sensor assembly, according to some embodiments.
Figure 3:
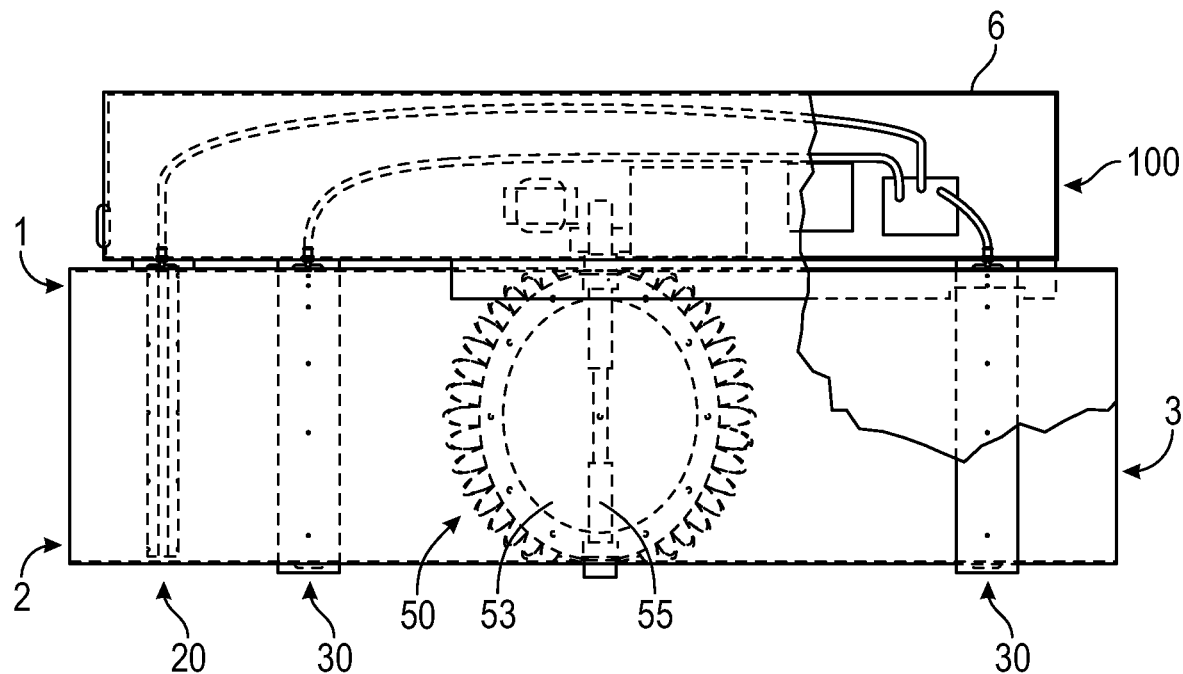
FIG. 3 is a side cutaway view of the air duct assembly of FIG. 1, according to some embodiments.
Figure 4:
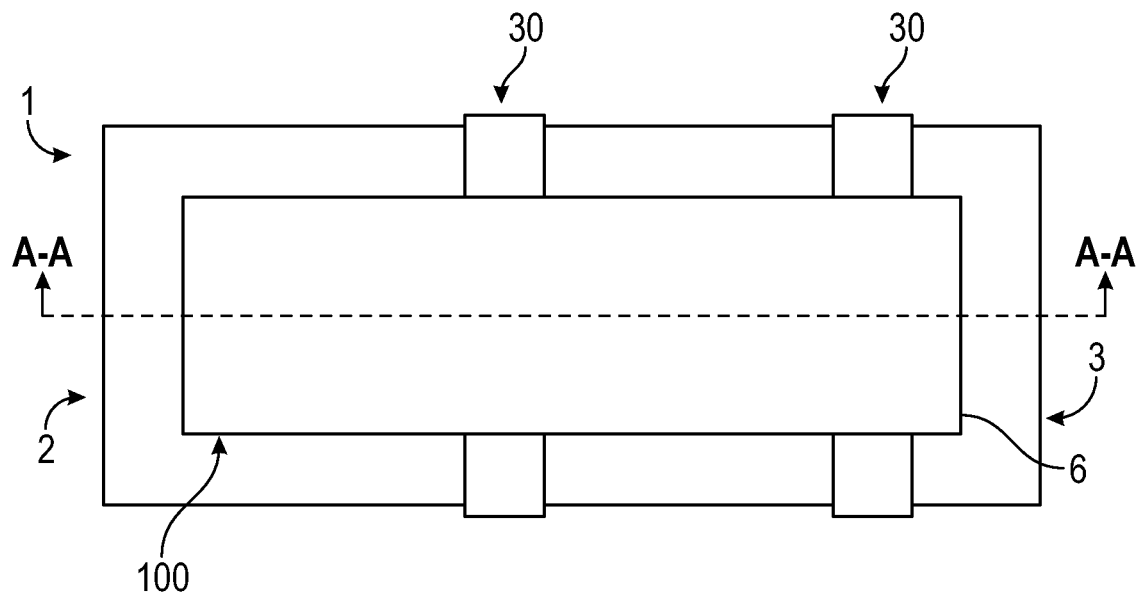
FIG. 4 is a top elevation view of the air duct assembly of FIG. 1, according to some embodiments.

Referring now to FIGS. 2 and 3, a side-view of an interior of the air duct assembly 1 is shown (e.g., within the interior wall 4 and the housing 6), according to some embodiments. The control assembly 100 may include various sensors and be configured to receive one or more pressure measurements in order to determine a measured airflow within the air duct assembly 1. In other words, the control assembly 100 is operable within the air duct assembly 1 as an airflow sensor system. For example, the control assembly 100 of the air duct assembly 1 may include a first pressure sensor assembly 20 and a second pressure sensor assembly 30. The first pressure sensor assembly 20 may detect one or more pressure measurements via a first set (e.g., one or more) of ports (e.g., apertures, openings, holes, etc.) 21 disposed on a first body 23 and/or a second set of ports 22 disposed on a second body 24. Likewise, the second pressure sensor assembly 30 may detect one or more pressure measurements via a third set of ports 31 and/or a fourth set of ports 32. The third set of ports 31 and/or the fourth set of ports 32 is disposed within a body of the air duct assembly 1 such that they extend from the exterior wall 5 to the interior wall 4. The first pressure sensor assembly 20 and/or the second pressure sensor assembly 30 is communicably coupled to a measurement receiver 40. The measurement receiver 40 is communicably coupled to a controller 90 of the control assembly 100 (depicted in greater detail below with reference to FIG. 4) in order to facilitate the communication of one or more pressure measurements from the first pressure sensor assembly 20 and/or the second pressure sensor assembly 30 to the controller 90. Thus, the first pressure sensor assembly 20 and the second pressure sensor assembly 30 is communicably coupled to the controller 90 in order to provide pressure measurements in some embodiments. The controller 90 may, in turn, control the position of the air damper assembly 50 based on the pressure measurements (and/or a determination of airflow based thereon), as described in greater detail below.

As shown, the first pressure sensor assembly 20 is positioned between the first end 2 of the air duct assembly 1 and the second pressure sensor assembly 30 in some embodiments. In other embodiments, the first pressure sensor assembly 20 is positioned between the third set of ports 31 and the fourth set of ports 32. For example, the first pressure sensor assembly 20 is positioned intermediate the air damper assembly 50 and the third set of ports 31, or intermediate the air damper assembly 50 and the fourth set of ports 32. In other embodiments still, the second pressure sensor assembly 30 is positioned between the second pressure sensor assembly 30 and the second end 3 of the air duct assembly 1. In even other embodiments, the first pressure sensor assembly 20 is positioned in some other arrangement suitable to perform the systems and methods described herein.

As suggested above, the first pressure sensor assembly 20 may include the first body 23 and the second body 24. For example, the first body 23 and/or the second body 24 is annular (e.g., hollow) members (e.g., probes) disposed in a substantially parallel arrangement within the air duct assembly 1 (e.g., within the interior wall 4). The first body 23 may form an outer wall (e.g., surrounding an inner annular duct (e.g., path, conduit, tube, etc.), and the first set of ports 21 is disposed thereon. Likewise, the second body 24 may form an outer wall, and the second set of ports 22 is disposed thereon. In some embodiments, the first body 23 and the second body 24 are rigidly coupled to one another in order to maintain a particular arrangement relative to one another. In other embodiments, the first body 23 and the second body 24 are not coupled to one another. In this sense, while depicted as extending in a parallel fashion, the first body 23 and the second body 24 is arranged in any manner relative to one another and/or relative to the other components of the air duct assembly 1 in order to perform the systems and methods described herein.

In some embodiments, the first pressure sensor assembly 20 is operable as a pitot tube and thus operate to determine a dynamic pressure "pickup" between the first set of ports 21 and the second set of ports 22. As such, the first pressure sensor assembly 20 is operable to determine a first pressure measurement via the first set of ports 21 and/or a second pressure measurement via the second set of ports 22. In some embodiments, the first pressure measurement via the first set of ports 21 and/or the second pressure measurement via the second set of ports 22 is compared (e.g., by the controller 90) in order to determine a first differential pressure measurement.

In some embodiments, the first set of ports 21 is disposed in alignment (or some other operable geometry) on the first body 23 facing toward the first end 2 (e.g., against the direction of airflow through the air duct assembly 1). The first set of ports 21 may measure a stagnation pressure of the air flowing through the air duct assembly 1, such as a stagnation pressure measurement 901 with reference to FIG. 901. In other words, the first set of ports 21 may measure the static pressure at a stagnation point of the airflow within the air duct assembly 1. The stagnation point is a result of the orientation of the first set of ports 21 on the first body 23 of the first pressure sensor assembly 20 directly (or substantially directly) against the direction of airflow through the air duct assembly 1 in some embodiments. Accordingly, at such a "stagnation point," the fluid velocity of the airflow is zero (or substantially zero), thus converting kinetic energy of the airflow into pressure energy (isentropically) in some embodiments. In other embodiments, the first set of ports 21 is disposed on the first body 23 in other orientations relative to the first end 2 and may accordingly be used to determine other characterizations of air pressure associated with the air flowing through the air duct assembly 1, such as static pressure.

In some embodiments, the second set of ports 22 are be disposed in alignment (or some other operable geometry) on the second body 24 facing away (to some degree, at least) from the first end 2. For example, the second set of ports 22 is oriented on the second body 24 directly downstream with respect to the airflow (e.g., facing the second end 3 of the air duct assembly 1). As another example, the second set of ports 22 is oriented perpendicular with respect to the first set of ports 21 and/or the path of the airflow traveling from the first end 2 to the second end 3. The second set of ports 22 may measure a static pressure of the airflow within the air duct assembly 1, such as a static pressure measurement 902 with reference to FIG. 9. Thus, in some embodiments, the second set of ports 22 may measure a static pressure of the "free stream" airflow.

In some embodiments, the first set of ports 21 and the second set of ports 22 is fluidly coupled to a first conduit (e.g., a tube, pipe, etc.) 25 via the first body 23 and the second body 24 (respectively). The first conduit 25, in turn, is fluidly coupled to the measurement receiver 40. In some embodiments, the first conduit 25 may form two distinct channels each fluidly coupled to the first set of ports 21 (via the first body 23) or the second set of ports 22 (via the second body 24). In other embodiments, the conduit 25 forms a single channel. Accordingly, the first pressure sensor assembly 20 is used by the measurement receiver 40 to detect the stagnation pressure measurement 901 via the first set of ports 21 and the static pressure measurement 902 via the second set of ports 22. The measurement receiver 40 may in turn provide the stagnation pressure measurement 901 and the static pressure measurement 902 to the controller 90, which may determine a first differential pressure measurement based thereon. As described in greater detail below, the first differential pressure measurement is used to determine a first airflow measurement.

Figure 5:
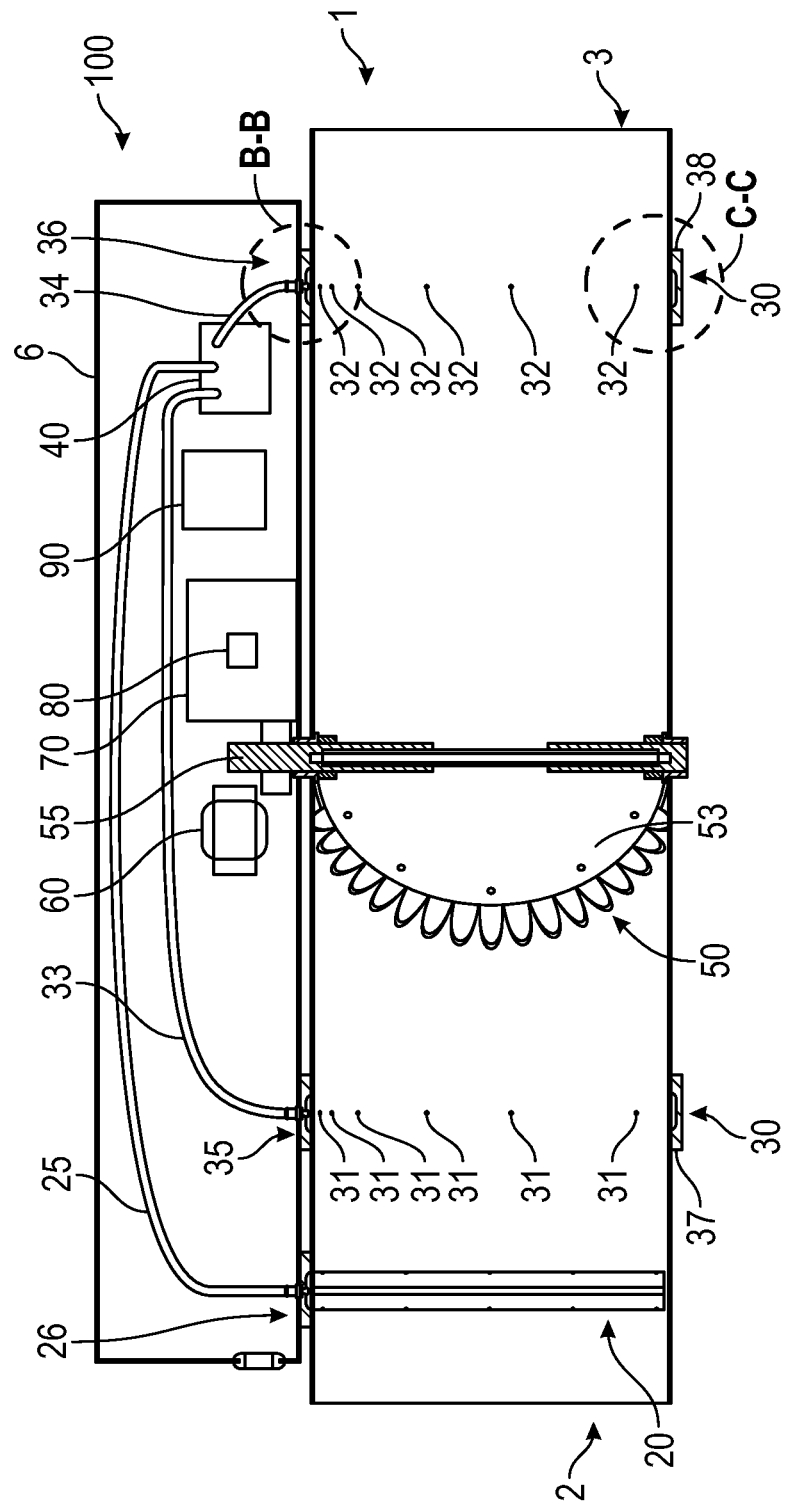
FIG. 5 is another top view of the air duct assembly of FIG. 1, according to some embodiments.

Referring now to FIGS. 4-7, the second pressure sensor 30 is shown in greater detail, according to some embodiments. As shown, FIG. 5 depicts a side cross-sectional view of the air duct assembly taken along the line B-B of FIG. 4. FIG. 5 identifies details B-B and C-C, which are shown with greater particularity in FIGS. 6 and 7 (respectively).

Referring particularly to FIG. 5, the third set of ports 31 and the fourth set of ports 32 is disposed in alignment (or some other operable geometry) within the air duct assembly 1, extending from the return exterior wall 5 to the interior wall 4. Thus, the third set of ports 31 and the fourth set of ports 32 is in fluid communication with the interior of the air duct assembly (e.g., within the interior wall 4) in order to detect one or more pressure measurements on either end of the air damper assembly 50. For example, the first set of ports 31 may measure a static pressure of the airflow upstream relative to the air damper assembly 50 (e.g., closer to the first end 2 than the air damper assembly 50), such as an upstream static pressure measurement 903 with reference to FIG. 9. The second set of ports 32 may measure a static pressure of the airflow downstream relative to the air damper assembly 50 (e.g., closer to the second end 3 than the air damper assembly 50), such as a downstream pressure measurement 904 with reference to FIG. 9. Accordingly, a difference between the upstream static pressure measurement 903 and the downstream static pressure measurement 904 may indicate a static pressure drop (e.g., pressure differential) due to the restriction of airflow resulting from the position of the air damper assembly 50 (e.g., the position of a surface 53 of the air damper assembly 50 that blocks airflow depending on a rotational position of the surface 53 about a shaft 55 of the air damper assembly). As described in greater detail below, the static pressure drop is interpreted by the controller 90 in order to determine a second airflow measurement, which is based on a rotational position of the air damper assembly 50.

As shown, the third set of ports 31 and the fourth set of ports 32 may each include multiple ports and be disposed in a ring-shape (or some other operable geometry) about the interior wall 4. In other embodiments, the third set of ports 31 and the fourth set of ports 32 may each include only a single port. The third set of ports 31 is fluidly coupled to the measurement receiver 40 via a second conduit 33 and the fourth set of ports 32 is fluidly coupled to the measurement receiver 40 via a third conduit 34. In some embodiments, the second pressure sensor assembly 30 includes a first sleeve 37 and a second sleeve 38, as depicted in greater detail below with reference to FIGS. 6 and 7. The first sleeve 37 is operable to facilitate the fluid communication between the third set of ports 31 and the second conduit 33. Likewise, the second sleeve 38 is operable to facilitate the fluid communication between the third set of ports 32 and the third conduit 34. The measurement receiver 40 may in turn provide the upstream static pressure measurement 903 and the downstream static pressure measurement 904 to the controller 90, which may determine a second differential pressure measurement. As described in greater detail below, the second differential pressure measurement is used to determine a second airflow measurement.

Figure 6:
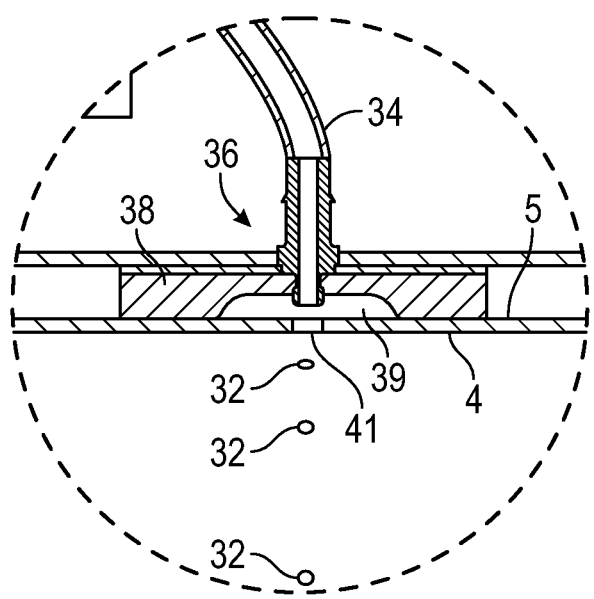
FIG. 6 is a side cross-sectional view of the air duct assembly taken along the line A-A of FIG. 5, according to some embodiments.
Figure 7:
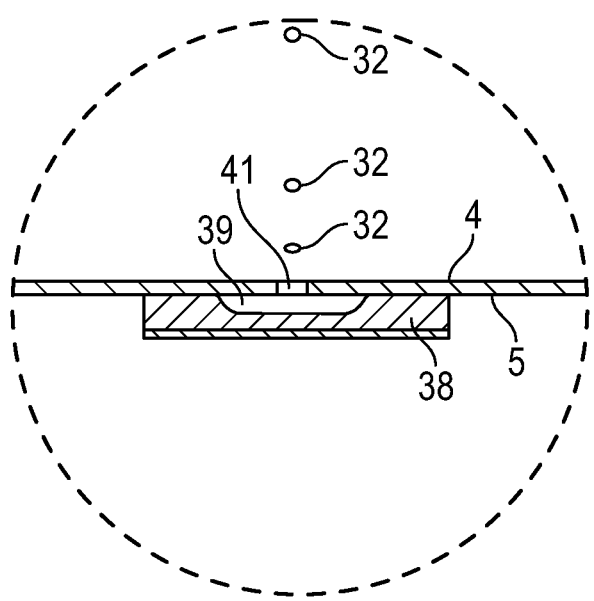
FIG. 7 is a detail view B-B of the air duct assembly of FIG. 6, according to some embodiments.

Referring now to FIGS. 6 and 7, details B-B and C-C of FIG. 6 are shown in greater particularity, according to some embodiments. As shown, the first sleeve 37 and the second sleeve 38 is located generally over the third set of ports 31 and the fourth set of ports 32, respectively. Each of the first sleeve 37 and the second sleeve 38 may form recessed areas about the exterior wall 5. For example, the second sleeve 38 may form a recess 39 fluidly coupled to the fourth set of ports 32 via an aperture 41. Accordingly, the measurement receiver 40 may detect the downstream static pressure measurement 904 using the fourth set of ports 32 via a third conduit 34 fluidly coupled to the recess 39 via an attachment point 36 at the aperture 41. The first sleeve 37 is similarly operable, according to some embodiments. For example, the measurement receiver 40 may detect the upstream static pressure measurement 903 using the third set of ports 31 via a second conduit 33 fluidly coupled to a recess enclosed by the first sleeve 37 by an aperture.

Figure 8:
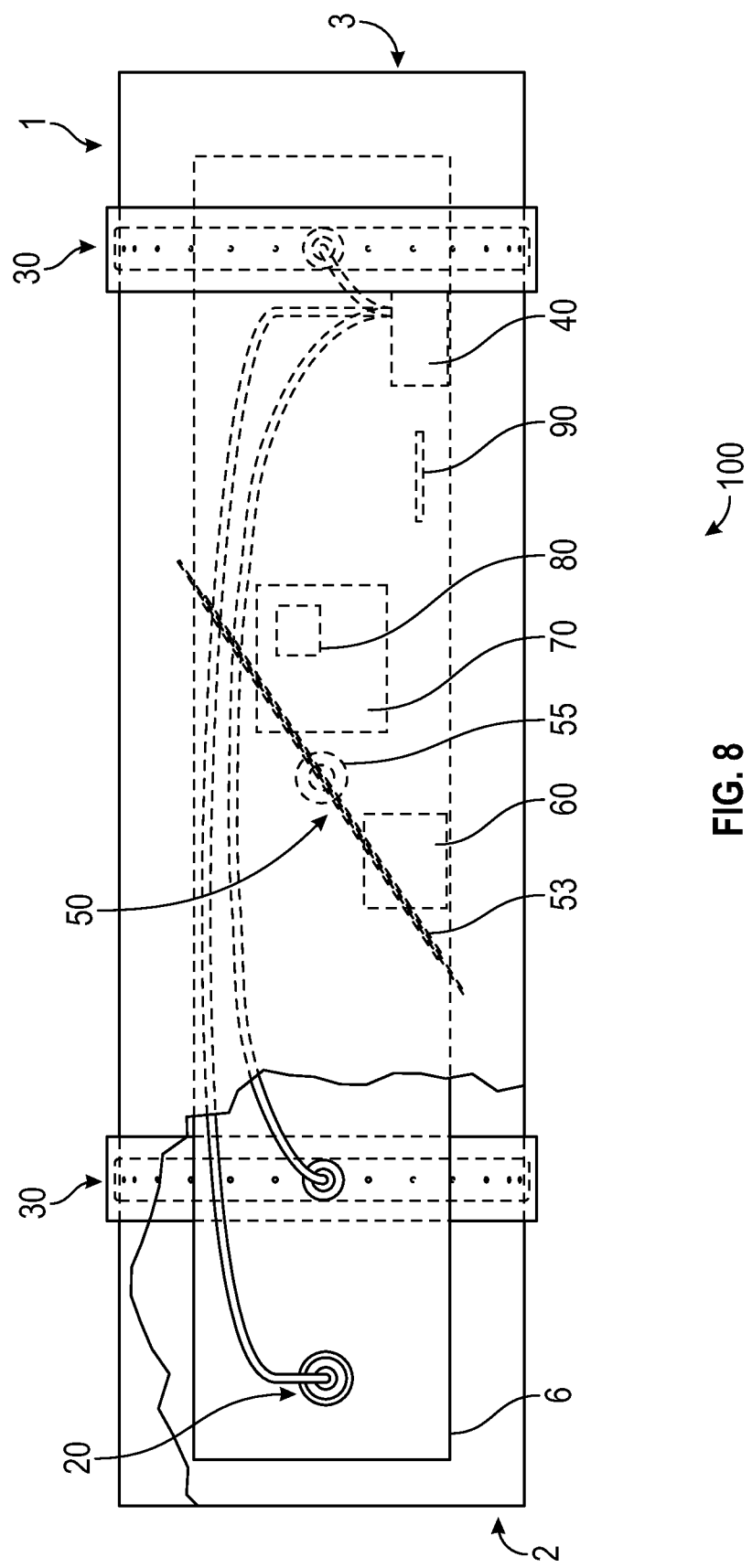
FIG. 8 is a detail view C-C of the air duct assembly of FIG. 6, according to some embodiments.

Referring now to FIG. 8, the control assembly 100 is shown in greater detail, according to some embodiments. As shown, the control assembly 100 includes the controller 90, the air damper assembly 50, the measurement receiver 40, a power supply 60, an actuator 70, and a position sensor 80.

In some embodiments, the position sensor 80 may measure the position of the air damper assembly 50. The position sensor 80 is configured to sense condition data (e.g., rotational position, movement, speed, etc.) associated with the air damper assembly 50, and communicate the condition of the air damper assembly 50 to the controller 90. For example, the position sensor 80 may determine a current (e.g., previous, original, measured) damper position, such as a damper position measurement 905 with reference to FIG. 9, and communicate the damper position measurement 905 to the controller 90. In some embodiments, the position sensor 80 is an ultrasonic or laser sensor that detects proximity, a Bluetooth® low energy (BLE) sensor that detects proximity of a BLE tag positioned on the air damper assembly 50, or some other type of sensor. For example, the position sensor 80 may determine a relative position of the surface 53 of the air damper assembly 50, and interpret the relative position of the surface 53 to determine a rotational position of the air damper assembly 50 as a whole. In other embodiments, the position sensor 80 is a component of the actuator 70 and determines a position of the air damper assembly 50 in accordance with the operation of the actuator 70 as described below.

In some embodiments, the actuator 70 is a stepper motor. In other embodiments, the actuator 70 is another type of motor. The actuator 70 may operate to move (e.g., translate) the rotational position of the air damper assembly 50 based on one or more commands provided by the controller 90. For example, the actuator 70 is operable to rotate the air damper assembly 50 via the shaft 55 extending along a central axis of the air damper assembly 50 (e.g., bisecting the surface 53 of the air damper assembly 50).

As suggested above, the position sensor 80 may determine a current position of the air damper assembly 50 in accordance with the operation of the actuator 70 (e.g., rather than providing a position measurement of the air damper assembly 50 independent of the actuator 70). In some implementations, the position sensor 80 is a motion sensing roller within the actuator 70 that uses an optical, mechanical, or electrical system to detect rotation of the air damper assembly 50. The motion sensing roller may measure the angle and/or frequency of rotations of the shaft 55, which is used to determine the rotational movement (e.g., a starting rotational position, an ending rotational position, a rotational speed, etc.) of the air damper assembly 50. In other implementations, particularly where the actuator 70 is a stepper motor, the actuator 70 may include the position sensor 80 as an electrical sensor. Rotation of the shaft 55 may result in rotation a motor core included in the actuator 70. The rotation of the motor core induces an electrical current in one or more electrical coils included actuator 70. The position sensor 80 (implemented as an electrical sensor) detects the induced electrical current in the one or more electrical coils and provides a corresponding signal to indicate a rotational position of the air damper assembly 50. A frequency of pulses of the induced current may also be used to indicate a speed at which the air damper assembly 50 is rotating.

The actuator 70 may use electricity supplied by main power. The main power is converted through use of a transformer and/or AC to DC converter (e.g., the power supply 60) to achieve the electrical supply that the actuator 70 requires. In other embodiments, the actuator 70 is powered by the power supply 60, which is an independent battery. In other embodiments still, the power supply 60 is a supplemental battery used in addition to mains power. Where the actuator 70 is powered by the power supply 60, the actuator 70 is able to control the rotational position of the air damper assembly 50 in the event of a power failure (the main power, for example). Where the power supply 60 is rechargeable, it is recharged by main power.

In some embodiments, the controller 90 is communicably coupled to the position sensor 80 and use information provided by the position sensor 80 to determine the current position of the air damper assembly 50. This information is used to adjust a position of the air damper assembly 50 in response to a difference between a setpoint airflow value (stored by the controller 90, communicated to the controller 90 by the remote device 7, etc.) and an estimated airflow value determined by the controller 90. In some embodiments, the controller 90 is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. In various embodiments, the controller 90 is communicably coupled to some or all of the components of the control assembly 100. For example, the controller 90 may receive power data from the power supply 60 regarding a battery life status of the power supply 60 (e.g., in instances where the power supply 60 is an independent power source used to power the control assembly 100).

In other embodiments, the controller 90 includes some or all of the components of the control assembly 100. The controller 90 (and the control assembly 100 as a whole, depending on the implementation) may include one or more processors, memory, circuity, and so on in order to facilitate the systems and methods described herein, as described in greater detail below.

Figure 9:
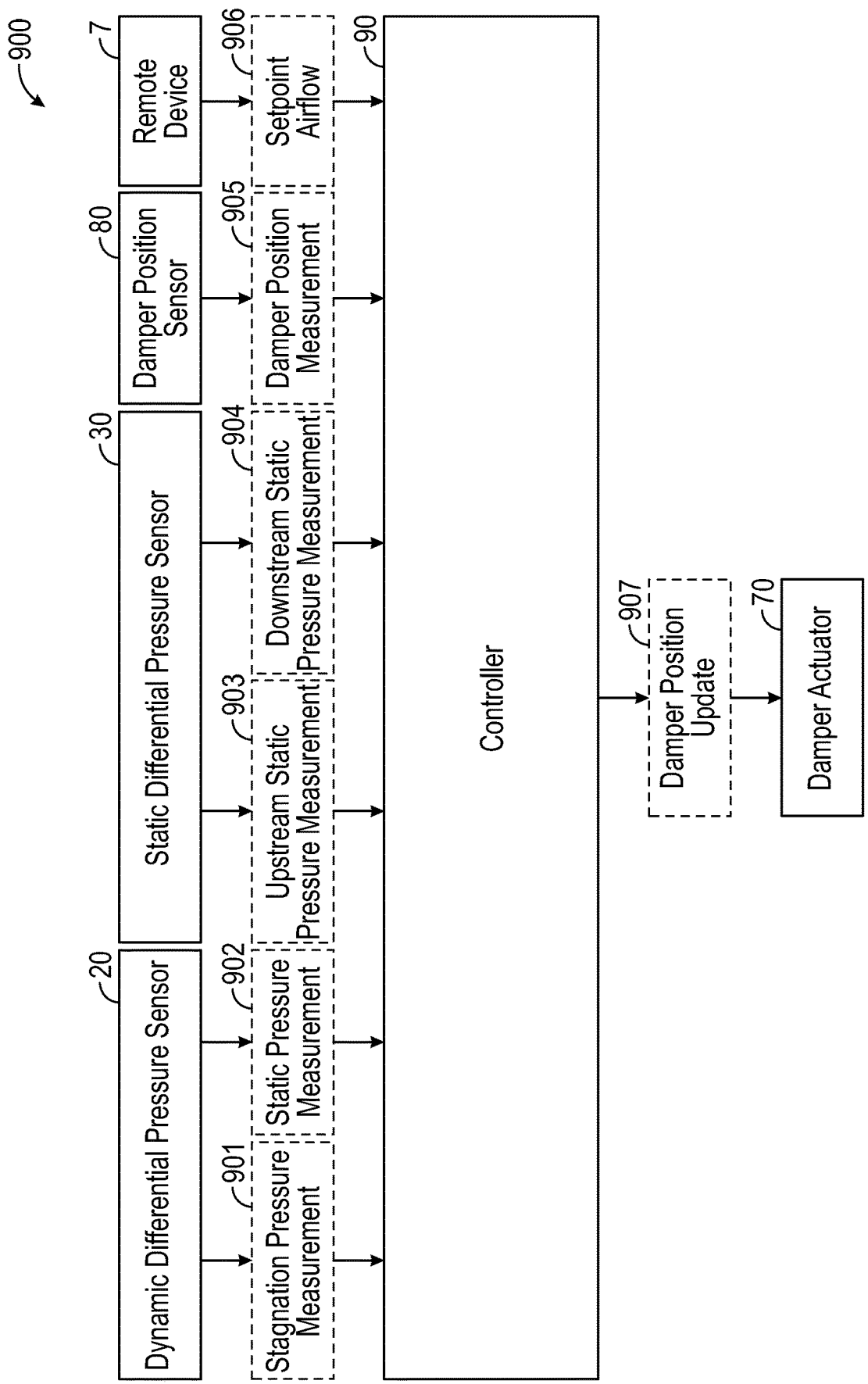
FIG. 9 is a flow diagram showing a controller controlling the position of an air damper of an air duct, according to some embodiments.

Referring to FIG. 9, a flow 900 for controlling the position of the air damper assembly 50 is shown, according to some embodiments. In some embodiments, the controller 90 may receive the stagnation pressure measurement 901 and the static pressure measurement 902 from the first pressure sensor assembly 20 as suggested above; the upstream static pressure measurement 903 and the downstream static pressure measurement 904 from the second pressure sensor assembly 30; and the damper position measurement 905 from the position sensor 80, as suggested above. The controller 90 may further receive a setpoint airflow value 906 from the remote device 7. For example, the remote device 7 is configured to provide the controller 90 with a desired airflow value (e.g., an amount of airflow discharged via the outlet or second end 3). As described in greater detail below with reference to FIG. 10, the controller 90 may determine a first measured airflow value via the pressure measurements 901 and 902 and a second measured airflow value via the pressure measurements 903 and 904. As suggested above, the first measured airflow and the second measured airflow may include an uncertainty value. Based on the first measured airflow value, the second measured airflow value, and the uncertainty values associated therewith, the controller 90 may determine an estimated airflow value of a greater accuracy (e.g., a lower uncertainty value) than the first measured airflow value and the second measured airflow value, according to some embodiments. The controller 90 may then compare the estimated airflow value to the setpoint airflow value 906, and provide the actuator 70 with a damper position update 907 in order to decrease a difference between the estimated airflow value and the setpoint airflow value 906, should one exist.

Figure 10:
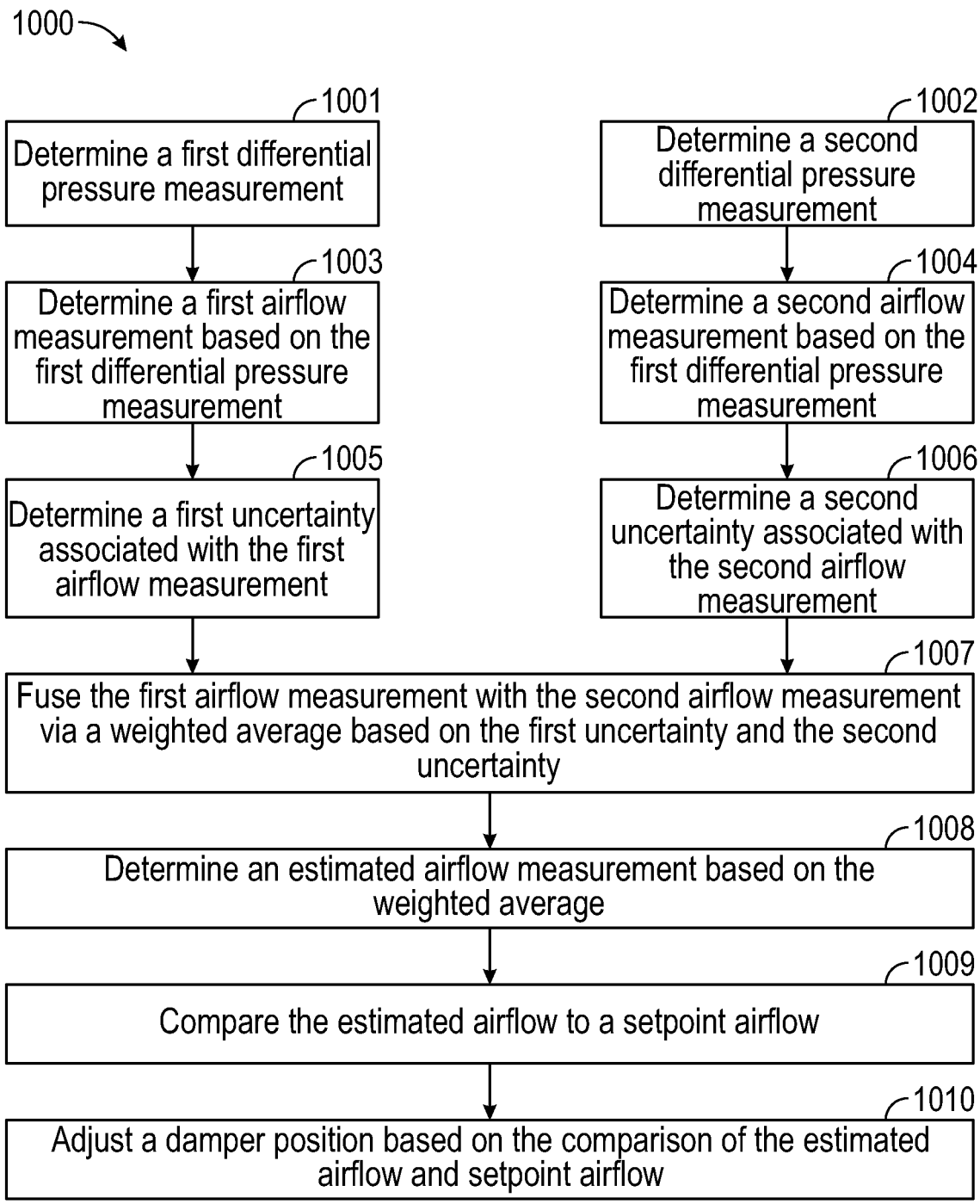
FIG. 10 is a flow diagram of a method for determining an adjusted position of an air damper of the air duct of FIG. 9, according to some embodiments.

Referring to FIG. 10, a flow 1000 for controlling the position of the air damper assembly 50 is shown, according to some embodiments. At process 1001, the controller 90 may determine a first differential pressure measurement $\Delta P_{meas1}$ as provided by the first pressure sensor assembly 20. For example, the first differential pressure measurement $\Delta P_{meas1}$ is based on the stagnation pressure measurement 901 and the static pressure measurement 902 determined by the first pressure sensor assembly 20. At process 1002, the controller 90 may determine a second differential pressure measurement $\Delta P_{meas2}$ as provided by the second pressure sensor assembly 30. For example, the second differential pressure measurement $\Delta P_{meas2}$ is based on the upstream static pressure measurement 903 and the downstream static pressure measurement 904.

At process 1003, $\Delta P_{meas1}$ is used to determine a first volumetric air flow rate (e.g., a first airflow measurement $Q_{meas1}$). For example, the stagnation pressure measurement 901 and the static pressure measurement 902 is applied to Bernoulli's equation, detailed below as Equation 1.

$$P_1 + \frac{\rho}{2}v_1^2 = P_2 + \frac{\rho}{2}v_2^2. \qquad \text{Equation 1}$$

$P_1$ is the stagnation pressure measurement 901 ($P_{stag}$) and $P_2$ is the static pressure measurement 902 of the free stream airflow ($P_{free}$). $v_1$ is the velocity at the stagnation point of the airflow. $v_1$ is assumed to be zero due to the orientation of the first set of ports 21. $v_2$ is the velocity of the free stream of airflow $v_{free}$. Accordingly, the measured difference between $P_{stag}$ and $P_{free}$ ($\Delta P_{meas1}$) is used to determine $v_{free}$. However, the second set of ports 22 may measure an air pressure that is less than the true (e.g., actual) static pressure of the free stream airflow. For example, the obstruction of airflow due to the presence of the second body 24 may result in the second set of ports 22 measuring the pressure of airflow that is in the "wake" of the second body 24, and thus less than the pressure of the true static pressure of the air flowing through the air duct assembly 1. Thus, a "pick up" gain K is applied to $\Delta P_{meas}$ to correct for the difference between the measured difference in static pressure between $P_{stag}$ and $P_{free}$ and the true difference in static pressure between $P_{stag}$ and $P_{free}$. Thus, $\Delta P$ of Equation 1 is expressed as $\Delta P_{meas1}$, provided below in Equation 2. Equation 2, in turn, is rearranged to solve for $v_{free}$ as expressed in Equation 3 provided below.

$$\Delta P_{meas1} = P_{stag} - P_{free} = K\frac{\rho}{2}v_{free}^2. \qquad \text{Equation 2}$$

$$\sqrt{\frac{2\Delta P_{meas1}}{\rho K}} = v_{free}. \qquad \text{Equation 3}$$

Accordingly, at process 1003, the controller 90 may determine a first airflow measurement $Q_{meas1}$ as provided by the first pressure sensor assembly 20. By applying the cross-sectional area of the air duct assembly 1 ($A_d$) to $v_{free}$, a volumetric flow rate of the air flowing though the air duct assembly 1 via the dynamic pressure pickup is determined to represent $Q_{meas1}$, as expressed below in Equation 4.

$$Q_{meas1} = A_d\sqrt{\frac{2\Delta P_{meas}}{\rho K}} = A_d v_{free}. \qquad \text{Equation 4}$$

At process 1004, the controller 90 may determine a second airflow measurement $Q_{meas2}$. For example, the upstream static pressure measurement 903 and the downstream static pressure measurement 904 is used to determine a measurement of air velocity, which in turn is used to determine a second volumetric air flow rate (e.g., a second airflow measurement $Q_{meas2}$). Referring to Equation 1 above, $P_1$ is the upstream static pressure ($P_{US}$), $P_2$ is the downstream static pressure ($P_{DS}$), $v_{US}$ is the upstream air velocity, and $v_{DS}$ is the downstream air velocity. Thus, Equation 1 is expressed as second measured pressure differential as detailed below in Equation 5.

$$\Delta P_{meas2} = P_{US} - P_{DS} = \frac{\rho}{2}v_{US}^2 - \frac{\rho}{2}v_{DS}^2. \qquad \text{Equation 5}$$

In some embodiments, the second differential pressure measurement $\Delta P_{meas2}$ is used to determine the second airflow measurement $Q_{meas2}$ based on the static pressure drop provided by the second pressure sensor assembly 30 through differential equations or other algebraic means. In other embodiments, rather than determining $$\frac{\rho}{2}v_{US}^2 - \frac{\rho}{2}v_{DS}^2,$$

the pressure drop $\Delta P_{meas2}$ is modeled as a relationship between the volumetric air flow and a flow coefficient $C_v$ as expressed below in Equation 6, and rearranged to solve for $Q_{meas2}$ as expressed below in Equation 7.

$$\Delta P_{meas2} = \frac{Q^2}{C_v^2}. \qquad \text{Equation 6}$$

$$Q_{meas2} = C_v\sqrt{\Delta P_{meas2}}. \qquad \text{Equation 7}$$

While depicted as a square root relationship between $Q_{meas2}$ and $\Delta P_{meas2}$, other relationships is used, such as a different exponent or a different equation entirely.

In some embodiments, depending on various adjustments to the orientation of the air damper assembly 50, the flow coefficient $C_v$ is a function of the rotational position $\Theta$ (e.g., the damper position measurement 905) of the air damper assembly 50. Accordingly, $Q_{meas2}$ is further expressed as detailed below in Equation 8.

$$Q_{meas2} = f(\Theta)\sqrt{\Delta P_{meas1}} \qquad \text{Equation 8.}$$

Figure 11:
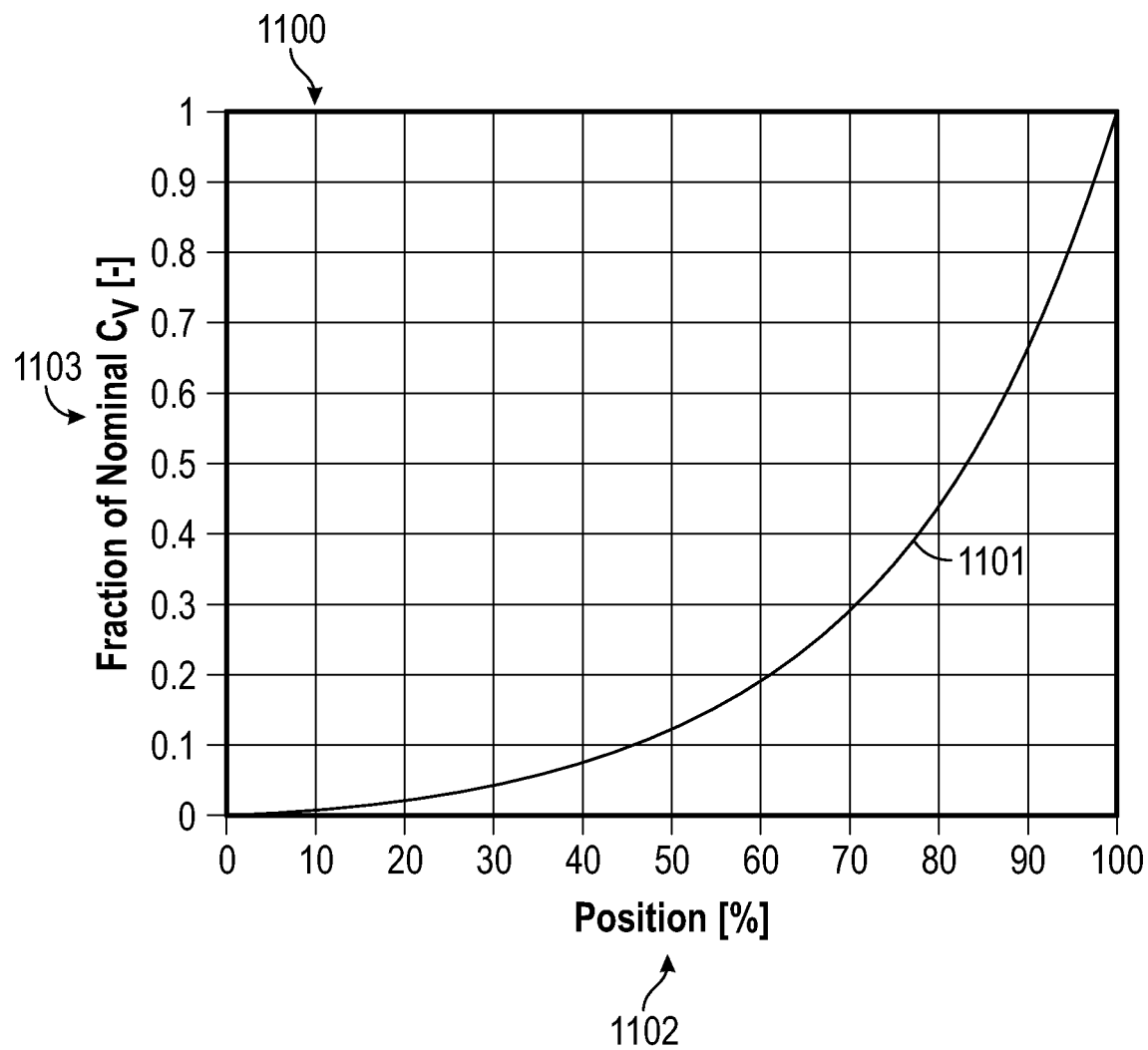
FIG. 11 is a plot depicting a characteristic curve of a damper, according to some embodiments.

Equation 8 is referred to as a "damper's characteristic curve," and is unique to each damper (e.g., shape, structure, etc.), such as the air damper assembly 50. In some cases, dampers may correspond to a characteristic curve that equates a position of the damper normalized between a zero-percent open (e.g., fully closed, perpendicular to the airflow through the air duct assembly 1, etc.) position and a one-hundred-percent open (e.g., fully open, parallel to the airflow through the air duct assembly 1, etc.) position. An example damper characteristic curve 1101 is depicted with on a plot 1100 with reference to FIG. 11 (dep. associating a normalized rotational position measurement 1102 ($\Theta$) with a flow coefficient 1103 ($C_v$). Using the damper's characteristic curve (or another equation that similarly models a damper characteristic curve), $C_v$ is determined as suggested above based on the damper position measurement 905, and thus $Q_{meas2}$ is determined accordingly based on the upstream static pressure measurement 903 and the downstream static pressure measurement 904.

At process 1005, the controller 90 may determine a first uncertainty (e.g., an uncertainty value, a propagation of multiple uncertainty values, etc.) associated with the first airflow measurement $Q_{meas1}$. For example, $Q_{meas1}$ may have some uncertainty value associated with it, as a result of uncertainties (e.g., error bands) regarding the operation the first pressure sensor assembly 20 measuring $P_{stag}$ and $P_{free}$; and thus $P_{meas1}$. In other words, any of the aforementioned measured values is a result, at least in part, of a deviation between the first airflow measurement $Q_{meas1}$ and an actual value of the first airflow.

At process 1006, the controller 90 may determine a second uncertainty associated with the second airflow measurement $Q_{meas2}$. For example, $Q_{meas2}$ may have some uncertainty value associated with it as a result of uncertainties regarding the operation the second pressure sensor assembly 30 measuring $\Delta P_{meas2}$ (via $P_{US}$ and $P_{DS}$) and $\Theta$. In other words, any of the aforementioned measured values is a result, at least in part, of a deviation between the second airflow measurement $Q_{meas2}$ and actual values of the second airflow.

In some embodiments, based on the number of variables used by the controller 90 to determine $Q_{meas1}$ and $Q_{meas2}$, propagation of uncertainties $\sigma_{prop1}$ and $\sigma_{prop2}$ is determined (respectively). In general, a propagation of uncertainty $\sigma_{prop}$ may identify a summation of the effects on a function $f$ (e.g., the determination of $Q_{meas1}$ and $Q_{meas2}$) by uncertainty of the variables $\sigma_{x_i}$ measured and applied to the function, as detailed below in Equation 9.

$$\sigma_{prop} = \sqrt{\sum_i \left(\frac{\partial f}{\partial x_i}\sigma_{x_i}\right)^2}.$$ Equation 9

In regards to process 1005 and $Q_{meas1}$, $\sigma_{prop}$ is determined as $\sigma_{prop1}$ based on the uncertainty $\sigma_{\Delta P_{meas1}}$ associated with $\Delta P_{meas1}$ according to Equation 10 below.

$$\sigma_{prop1} = \frac{dQ_{meas1}}{d\Delta P_{meas1}}\sigma_{\Delta P_{meas1}}.$$ Equation 10

In regards to process 1006 and $Q_{meas2}$, $\sigma_{prop}$ is determined as $\sigma_{prop2}$ based on the uncertainties $\sigma_{\Delta P_{meas2}}$ and $\sigma_\Theta$ associated with $\Delta P_{meas2}$ and $\Theta$ according to Equation 11 below.

$$\sigma_{prop2} = \sqrt{\left(\frac{dQ_{meas2}}{d\Delta P_{meas2}}\sigma_{\Delta P_{meas2}}\right)^2 + \left(\frac{dQ_{meas2}}{d\theta}\sigma_\theta\right)^2}.$$ Equation 11

At process 1007, the controller 90 may mathematically fuse (e.g., link, relate, cross-reference) the first airflow measurement $Q_{meas1}$ and the second airflow measurement $Q_{meas2}$ via a weighted averaging based on the first propagation of uncertainty or $\sigma_{prop1}$ and the second propagation of uncertainty $\sigma_{prop2}$. Thus, a first weighting factor is applied to $Q_{meas1}$ and a second weighting factor is applied to $Q_{meas2}$ to determine an estimated flow rate $Q_{Est}$. In some embodiments, the weighting factors is based on inverse-variance weighting. Advantageously, inverse-variance weighting is a method of aggregating two or more variables to potentially minimize (or decrease) the uncertainty associated with the aggregated value relative to the uncertainties of the values aggregated. In general, given a sequence of variables $y_i$ with variances $\sigma_i^2$, the inverse-variance weighted average $\dot{y}$ is given by Equation 12 below, which is applied to $Q_{meas1}$ and $Q_{meas2}$ as given by Equation 13 below in order to yield $Q_{Est}$ $$\dot{y} = \frac{\sum_i \frac{y_i}{\sigma_i^2}}{\sum_i \frac{1}{\sigma_i^2}}.$$ Equation 12

$$Q_{Est} = \frac{\frac{Q_{meas1}}{\sigma_{prop1}^2} + \frac{Q_{meas2}}{\sigma_{prop2}^2}}{\frac{1}{\sigma_{prop1}^2} + \frac{1}{\sigma_{prop2}^2}}.$$ Equation 13

In some embodiments, as indicated by Equation 13 above and the systems and methods disclosed herein, as the uncertainty regarding the first airflow measurement increases relative to the uncertainty regarding the second airflow measurement, its representation relative to the second airflow measurement in terms of the estimated airflow (e.g., how much the value of $Q_{meas1}$ numerically contributes to the calculation of $Q_{Est}$ relative to $Q_{meas2}$) decreases, and vic-versa. As suggested above, the uncertainty $\sigma_{Est}$ of $Q_{Est}$ may thus be less than the uncertainties of $Q_{meas1}$ and/or $Q_{meas2}$. For example, given Equation 13 above, the uncertainty of $Q_{Est}$ is determined as provided by Equation 14 below.

$$\sigma_{Est} = \sqrt{\frac{1}{\frac{1}{\sigma_{dyn}^2} + \frac{1}{\sigma_{static}^2}}}.$$ Equation 14

In some embodiments, the air duct assembly 1 is operable to determine the estimated airflow $Q_{Est}$ (with an improved uncertainty value $\sigma_{Est}$) without necessarily completing processes 1008 and 1009 below. For example, the controller 90 may determine $Q_{Est}$ and transmit $Q_{Est}$ to a remote device, such as the remote device 7 in order to provide a status of the air duct assembly 1. In such cases, the flow 1000 may stop here. In other embodiments, the flow 1000 continues in accordance with processes 1008 and 1009 as described below.

At process 1008, the controller 90 may compare the estimated airflow to a setpoint airflow. For example, the controller 90 may have received the setpoint airflow value 906 from the remote device 7 with reference to FIG. 9. In turn, the controller 90 may compare the setpoint airflow value 906 to $Q_{Est}$.

In some cases, if the controller determines that $Q_{Est}$ is greater than the setpoint airflow value 906, the controller 90 may determine that the airflow traveling through the air duct assembly 1 is greater than the desired (e.g., selected, optimized, required, etc.) airflow traveling through the air duct assembly 1 as requested by the remote device 7. Thus, the controller 90 may determine that the airflow is decreased in order to decrease a difference between and the setpoint airflow value 906 and adjust the position of the air damper assembly 50 accordingly, as described in greater detail below with reference to process 1009.

In other cases, if the controller determines that $Q_{Est}$ is less than the setpoint airflow value 906, the controller 90 may determine that the airflow traveling through the air duct assembly 1 is less than the desired airflow traveling through the air duct assembly 1 as requested by the remote device 7. Thus, the controller 90 may determine that the airflow is increased in order to decrease a difference between and the setpoint airflow value 906 and adjust the position of the air damper assembly 50 accordingly, as described in greater detail below with reference to process 1009.

In other cases, still, the controller 90 may determine that $Q_{Est}$ is equivalent (or substantially so) to the setpoint airflow value 906. For example, the controller 90 may determine that $Q_{Est}$ is within an acceptable threshold range relative to the setpoint airflow value 906. In some embodiments, the acceptable threshold range is a percentage deviation as provided below in Equation 15.

In other embodiments, the acceptable threshold range is an absolute value difference between $Q_{Est}$ and the setpoint airflow value 906 as provided below in Equation 16. In such various cases where the controller 90 determines that $Q_{Est}$ is equivalent to the setpoint airflow value 906 or within an acceptable threshold range, the controller 90 may determine that no update to the position of the air damper assembly 50 is necessary, and thus the controller 90 may not adjust the position of the air damper assembly 50 as described below with reference to Process 1009.

At process 1009, the controller 90 may adjust a damper position of the air damper assembly 50 based on the comparison of $Q_{Est}$ and the setpoint airflow value 906. For example, the controller 90 may provide the damper position update 907 to the damper actuator 70.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It should be noted that the flow 900 shown in FIG. 9 may include any of the features discussed with respect to the other embodiments disclosed elsewhere herein, including the use of a single pressure sensor assembly, multiple pressure sensor assemblies, multiple air damper assemblies, multiple air ducts, multiple ports of the pressure sensor assemblies, differing types of sensors, actuators, etc. Similarly, any of the features of FIG. 9 may be incorporated into the other embodiments disclosed herein. All such combinations of features are to be understood to be within the scope of the present disclosure.

It is important to note that any element disclosed in one embodiment may be incorporated or utilized with any other embodiment disclosed herein. For example, the second pressure sensor assembly 30, shown as positioned in FIG. 1A, may be incorporated in the air duct assembly that includes the first pressure sensor assembly 20, shown as positioned in FIG. 2. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An airflow sensor system for an air duct comprising a duct wall and an axial bore that extends from an inlet of the air duct to an outlet of the air duct for conveying an airflow through the air duct from the inlet to the outlet, the airflow sensor system comprising:
    a first pressure sensor configured to detect a first one or more pressure measurements;
    a second pressure sensor configured to detect a second one or more pressure measurements;
    a damper position sensor configured to detect one or more damper position measurements associated with a damper located within the axial bore; and
    a controller configured to:
        determine, based on the first one or more pressure measurements, a first airflow measurement having an associated first uncertainty value;
        determine, based on the second one or more pressure measurements and the one or more damper position measurements, a second airflow measurement having an associated second uncertainty value;
        determine a first weighted value of the first airflow measurement based on the first uncertainty value;
        determine a second weighted value of the second airflow measurement based on the second uncertainty value; and
        determine an estimated airflow based on the first weighted value and the second weighted value, wherein the first weighted value increases relative to the second weighted value in response to an increase of the second uncertainty value relative to the first uncertainty value.

2. The system of claim 1, wherein an uncertainty value associated with the estimated airflow is less than at least one of the first uncertainty value and the second uncertainty value.

3. The system of claim 1, wherein the damper is transitionable between a plurality of positions to regulate the conveyance of the airflow though the air duct from the inlet to the outlet, and wherein the controller is further configured to selectively control the operation of the damper to selectively transition between a current position of the damper and an updated position of the damper based on the estimated airflow.

4. The system of claim 1, wherein the first pressure sensor is positioned intermediate the inlet and the second pressure sensor, wherein the first pressure sensor comprises:
    one or more probes extending into the axial bore;
    a first set of one or more ports disposed on the one or more probes, the first set of one or more ports is configured to detect at least one pressure measurement of the first one or more pressure measurements; and
    a second set of one or more ports disposed on the one or more probes, the second set of one or more ports is configured to detect at least one pressure measurement of the first one or more pressure measurements and positioned closer to the outlet than the first set of one or more ports, and wherein the second pressure sensor comprises:
    a third set of one or more ports disposed within the duct wall, the third set of ports configured to detect at least one pressure measurement of the second one or more pressure measurements and positioned closer to the outlet than the second set of ports; and
    a fourth set of one or more ports disposed within the duct wall, the fourth set of ports configured to detect at least one pressure measurement of the second one or more pressure measurements and positioned closer to the outlet than the third set of one or more ports.

5. The system of claim 1, wherein determining the first airflow measurement based on the first one or more pressure measurements comprises:
    determining a first differential pressure measurement based on the first one or more pressure measurements; and
    determining the first airflow measurement based on the first differential pressure measurement, and wherein determining the second airflow measurement based on the second one or more pressure measurements and the one or more damper position measurements comprises:
    determining a second differential pressure measurement based on the second one or more pressure measurements; and
    determining the second airflow measurement based on the second differential pressure measurement and the one or more damper position measurements.

6. The system of claim 2, wherein the first set of ports faces towards the inlet and a velocity associated with the airflow at the first set of ports is assumed to be zero.

7. The system of claim 4, wherein the first uncertainty value is based on propagated uncertainty values regarding:
    the at least one pressure measurement of the first one or more pressure measurements detected by the first set of ports; and
    the at least one pressure measurement of the first one or more pressure measurements detected by the second set of ports, and wherein the second uncertainty value is based on propagated uncertainty values regarding:
    the at least one pressure measurement of the second one or more pressure measurements detected by the third set of ports;
    the one or more damper position measurements; and
    the at least one pressure measurement of the second one or more pressure measurements detected by the fourth set of ports.

8. The system of claim 5, wherein the damper is located within the axial bore intermediate the third set of ports and the fourth set of ports, the damper is transitionable between a plurality of positions to regulate the conveyance of the airflow though the air duct from the inlet to the outlet, and the controller is further configured to:

determine a current position of the damper based on the one or more damper position measurements; and control the operation of the damper to selectively transition between the current position of the damper and an updated position of the damper based on a comparison of the estimated airflow and a setpoint airflow.

9. The system of claim 8, wherein the setpoint airflow is transmitted from a remote device to the controller.

10. The system of claim 8, wherein the first uncertainty value is based on propagated uncertainty values regarding:

at least one pressure measurement of the first one or more pressure measurements detected by the first set of ports; and at least one pressure measurement of the first one or more pressure measurements detected by the second set of ports, and wherein the second uncertainty value is based on propagated uncertainty values regarding:

at least one pressure measurement of the second one or more pressure measurements detected by the third set of ports;

at least one pressure measurement of the second one or more pressure measurements detected by the fourth set of ports; and at least one of the one or more damper position measurements.

11. A method of operating an air duct, the method comprising:

measuring a first differential pressure measurement regarding an airflow within the air duct with a first pressure sensor, the first differential pressure measurement having an associated first uncertainty value;

measuring a second differential pressure measurement regarding the airflow with a second pressure sensor, the second differential pressure measurement having an associated second uncertainty value different than the first uncertainty value;

sending, via the first pressure sensor, the first differential pressure measurement to a controller;

sending, via the second pressure sensor, the second differential pressure measurement to the controller;

determining, via the controller, a first airflow measurement based on the first differential pressure measurement, the first airflow measurement having a third uncertainty value based on the first uncertainty value;

determining, via the controller, a second airflow measurement based on the second differential pressure measurement, the second airflow measurement having a fourth uncertainty value based on the second uncertainty value; and determining, via the controller, an estimated airflow based on the first airflow measurement, the second airflow measurement, the third uncertainty value, and the fourth uncertainty value, the estimated airflow having an associated fifth uncertainty value that is less than the third uncertainty value and the fourth uncertainty value.

12. The method of claim 11, further comprising operating, via the controller, a valve positioned within the air duct and transitionable between a plurality of positions to regulate the airflow, wherein the operation of the valve is based on the estimated airflow.

13. The method of claim 12, further comprising:

determining a current position of the valve with a valve sensor, the current position of the valve having a sixth uncertainty value; and sending, via the valve sensor, the current position to the controller, wherein operating the valve comprises controlling the valve to selectively transition between the current position and an updated position of the valve, and wherein one of the third uncertainty value and the fourth uncertainty value is further based on the sixth uncertainty value.

14. The method of claim 12, wherein operating the valve comprises controlling the valve to selectively transition between a current position and an updated position in order to decrease a difference between the estimated airflow and a setpoint airflow.

15. The method of claim 14, wherein the setpoint airflow is provided to the controller via a remote device.

16. A controller for operating an air duct, the controller comprising one or more processors and a memory storing instructions that, when executed by the one or more processors, cause the one or more processors to:

obtain, via a plurality of pressure sensors, a plurality of differential pressure measurements regarding an airflow within the air duct;

determine a plurality of uncertainty values regarding the plurality of differential pressure measurements, wherein a first uncertainty value of the plurality of uncertainty values is different than a second uncertainty value of the plurality of uncertainty values; and determine an estimated airflow based on the plurality of differential pressure measurements and the plurality of uncertainty values, wherein the estimated airflow has an associated third uncertainty value that is less than the first uncertainty value and the second uncertainty value; and control, based on the estimated airflow, an actuator to move a damper positioned within the air duct between a plurality of positions to regulate the airflow.

17. The controller of claim 16, wherein the estimated airflow is further based on a current position of the plurality of positions of the damper.

18. The controller of claim 16, wherein the instructions further cause the one or more processors to receive a setpoint airflow from a remote device, and control the actuator to selectively transition the damper between a current position and an updated position of the plurality of positions in order to decrease a difference between the estimated airflow and the setpoint airflow.

19. The controller of claim 16, wherein the instructions further cause the one or more processors to determine a current position of the plurality of positions based on measuring, via an electrical sensor, one or more electric impulses generated by the actuator in response to a movement of the damper.

* * * * *